United States Patent [19]
Volk et al.

[11] Patent Number: 5,986,801
[45] Date of Patent: Nov. 16, 1999

[54] IMAGE REINVERTER FOR STEREO MICROSCOPE

[76] Inventors: Donald A. Volk, 7893 Enterprise Dr., Mentor, Ohio 44060; Fernando Diaz-Estevez, Torneo, 34, Saville, 41002, Spain

[21] Appl. No.: 08/966,369

[22] Filed: Nov. 7, 1997

Related U.S. Application Data

[60] Provisional application No. 60/029,953, Nov. 8, 1996, and provisional application No. 60/031,537, Dec. 2, 1996.

[51] Int. Cl.$^6$ .......................... G02B 21/22; G02B 21/20; G02B 5/04
[52] U.S. Cl. .......................... 359/376; 359/377; 359/834; 359/375; 359/836
[58] Field of Search .................................... 359/834, 376, 359/831, 833, 835, 836, 375, 377, 431, 861, 401

[56] References Cited

U.S. PATENT DOCUMENTS

| | | | |
|---|---|---|---|
| 3,964,818 | 6/1976 | Humphrey | 359/376 |
| 4,634,223 | 1/1987 | Ishii | 359/834 |
| 4,822,150 | 4/1989 | Duarte | 359/834 |
| 5,009,487 | 4/1991 | Reiner | 359/376 |
| 5,321,477 | 6/1994 | Sander et al. | 359/376 |

FOREIGN PATENT DOCUMENTS

| | | |
|---|---|---|
| 01 93 818 A1 | 9/1986 | European Pat. Off. . |
| 382 6069 A1 | 2/1990 | Germany . |
| WO 94/10596 | 5/1994 | WIPO . |

*Primary Examiner*—Cassandra Spyrou
*Assistant Examiner*—Jennifer Winstedt
*Attorney, Agent, or Firm*—Venable; Robert Kinberg

[57] ABSTRACT

An inverting and reversing prism system for a stereo microscope having an optical longitudinal axis and left and right eye viewing systems having left and right longitudinal axes, respectively, along which left and right beam paths are transmitted, respectively, comprising: at least four reflecting surfaces (13, 15, 16, 13A and 13A, 15A, 16A, 13) in each beam path (14, 14A), two of the reflecting surfaces (13, 13A and 13A, 13) in each beam path comprising inlet and outlet surfaces, respectively, for deflecting the beam path by 90°, the inlet and outlet surfaces in each beam path being oriented 45° relative to the optical longitudinal axis of the microscope and 90° relative to each other, with a line of intersection (26) of planes containing the inlet and outlet surfaces in each beam path defining an angle of 45° with respect to a plane through the left and right longitudinal axes of the left and right eye viewing systems, with at least two other of the reflecting surfaces (15, 16 and 15A, 16A) in each beam path comprising intermediate reflecting surfaces disposed for deflecting the respective beam path from the inlet surface to the outlet surface.

33 Claims, 7 Drawing Sheets

TO DISENGAGE REINVERTER     TO ENGAGE REINVERTER

IMAGE REINVERTER FOR STEREO MICROSCOPE

CROSS-REFERENCE TO RELATED APPLICATIONS

This application claims the benefit of U.S. Provisional Application No. 60/029,953 filed in the United States on Nov. 8, 1996 and U.S. Provisional Application No. 60/031,537 filed in the United States on Dec. 2, 1996, the disclosures of which are incorporated herein by reference.

BACKGROUND OF THE INVENTION

The present invention relates to an image erecting and beam path interchanging optical system for use with a stereo microscope, such as a slit-lamp biomicroscope or operating microscope, for use during diagnostic observation, laser treatment or vitreoretinal surgery. More particularly the invention relates to a reflection based image erecting system, utilizing mirrors, prisms, or a combination of both to achieve both the vertical and horizontal inversion required in producing an upright and correctly oriented image, which can be retrofitted to an existing microscope, either as an external attachment to the end of the microscope containing the main collection lens or as a removable component positioned within the stereo microscope, between the end of the microscope containing the main collection lens and the opposite end of the microscope containing the left and right ocular tubes.

With the advent of modern vitreoretinal surgical procedures, including vitrectomy, retinal membrane removal and subretinal blood and membrane removal, the need to visualize a wide field section of the fundus, including the far peripheral retina, has become increasingly important. To this end, a variety of indirect ophthalmoscopy lens systems, both contact and non-contact, have been utilized or specially developed by researchers and manufacturers to assist the physician and to advance the state of the art.

Although providing a wide field of view required for present day vitreoretinal surgical procedures, an inherent disadvantage of these indirect ophthalmoscopy systems lies in the fact that the produced aerial image, of both the retina, and as importantly, the surgical instrumentation introduced into the eye, is reversed and inverted. Without an image inverting and reversing system, the physician may find it difficult, if not impossible, to perform a surgical procedure while viewing the surgical instrumentation and their movements within the eye in a vertically and horizontally reversed orientation.

SUMMARY OF THE INVENTION

It is therefore an object of the invention to provide an improved image erecting and beam path interchanging system for use in conjunction with a stereo microscope.

It is a further object of the invention to provide an image erecting and beam path interchanging system for use in conjunction with a stereo microscope which is very compact and low in profile.

It is another object of the invention to provide an improved image erecting and beam path interchanging system for use in conjunction with a stereo microscope wherein two mirrored surfaces inclined at 45° with respect to the optic longitudinal axis of a stereo microscope are constructed of a single glass or plastic piece defined as a right angle prism structure.

It is another object of the invention to provide an improved image erecting and beam path interchanging system whose optical function may be removed from the optical pathways of a stereo microscope by means of rotation of the system about a designated longitudinal axis.

It is another object of the invention to provide an improved image erecting and beam path interchanging system whose reflecting surfaces are all inclined 45° with respect to a microscope optical axis.

It is another object of the invention to provide an improved image erecting and beam path interchanging system which includes positive refractive power providing convergence of the ray bundles and imaging pathways within the device so as to reduce the working distance of the microscope to compensate for the use of auxiliary indirect fundus imaging lenses.

It is another object of the invention to provide an improved image erecting and beam path interchanging system including both positive and negative refractive power in order to provide magnification properties according to the principles of a Galilean telescope.

It is another object of the invention to provide an improved image erecting and beam path interchanging system wherein the beam pathways perpendicular to the optic longitudinal axis of the stereo microscope form generally a rhomboidal configuration.

It is another object of the invention to provide an improved image erecting and beam path interchanging system wherein ray pathways within the device which are generally perpendicular to the optic longitudinal axis of a stereo microscope depart from a single plane of propagation.

The above and other objects are accomplished according to the invention by the provision of an inverting and reversing prism system for a stereo microscope having an optical longitudinal axis and left and right eye viewing systems having left and right longitudinal axes, respectively, along which left and right beam paths are transmitted, respectively, comprising: at least four reflecting surfaces in each beam path, two of the reflecting surfaces in each beam path comprising inlet and outlet surfaces, respectively, for deflecting the beam path by 90°, the inlet and outlet surfaces in each beam path being oriented 45° relative to the optical longitudinal axis of the microscope and 90° relative to each other, with a line of intersection of planes containing the inlet and outlet surfaces in each beam path defining an angle of 45° with respect to a plane through the left and right longitudinal axes of the left and right eye viewing systems, with at least two other of the reflecting surfaces in each beam path comprising intermediate reflecting surfaces disposed for deflecting the respective beam path from the inlet surface to the outlet surface.

In accordance with the invention, the reflecting surfaces may be comprised of an internally reflecting prism structure and/or metalized mirrors, preferably formed together as a single unit and which may be positioned generally diagonally with respect to what is usually considered the normal viewing orientation of the biomicroscope such that rotation of the device about a longitudinal microscope axis allows the image erecting and beam path interchanging functions to be disassociated with the optical functioning of the stereo microscope. In a preferred embodiment of the invention the device may incorporate left and right eye retroreflective right angle prisms that are skewed in relation to the optical pathways in order to avoid internal reflections within the device from flat surfaces associated with the prisms. In a further preferred embodiment the device may also incorporate positive refractive power in order to provide convergence of the ray bundles and beam pathways within the device in order to shorten the working distance and increase the stereoscopic angle of the stereo microscope when used in association with contact or non-contact indirect fundus imaging.

According to another aspect of the invention there is provided an inverting and reversing prism system for a stereo microscope having an optical longitudinal axis and left and right eye viewing systems having left and right longitudinal axes, respectively, along which left and right beam paths are transmitted, respectively, comprising: two reflecting surfaces in each beam path comprising inlet and outlet surfaces, respectively, for deflecting the beam path by 90°, the inlet and outlet surfaces in each beam path being oriented 45° relative to the optical longitudinal axis of the microscope and 90° relative to each other, and intermediate reflecting surfaces disposed for deflecting the respective beam path from the inlet surface to the outlet surface of the respective beam path, wherein, in at least one of the left and right beam paths, the intermediate reflecting surfaces include four intermediate reflecting surfaces each inclined 45° with respect to the optical longitudinal axis of the microscope, the four intermediate reflecting surfaces including a first pair of intermediate reflecting surfaces disposed 90° to one another and intersecting in a first roof line and a second pair of intermediate reflecting surfaces disposed 90° to one another and intersecting in a second roof line, and the first and second roof lines forming an angle of 90°.

According to a still further aspect of the invention there is provided in the context of an inverting and reversing prism system for a stereo microscope having an optical longitudinal axis and left and right eye viewing systems having left and right longitudinal axes, respectively, along which left and right beam paths are deflected by a plurality of reflecting surfaces for inverting and reversing an image, the improvement wherein: two retro-reflectors constituting inlet and outlet retro reflectors, respectively, are disposed in one of the left and right beam paths and at least two intermediate reflecting surface are disposed in the one beam path for deflecting the beam from the inlet retro-reflector to the outlet retro-reflector, each retro-reflector including two reflecting surfaces oriented 90° to one another and intersecting in a roof line inclined 45° with respect to the optical longitudinal axis of the microscope.

According to yet another aspect of the invention there is provided an inverting and reversing prism system for a stereo microscope having an optical longitudinal axis and left and right eye viewing systems having left and right longitudinal axes, respectively, along which left and right beam paths are transmitted, respectively, comprising: three retro-reflectors in each beam path, each retro-reflector including two reflecting surfaces oriented 90° to one another and defining planes that intersect in a roof line, two of the retro-reflectors in each beam path being inlet and outlet retro-reflectors, respectively, and the one other retro-reflector in each beam path being an intermediate retro-reflector for deflecting the respective beam from the inlet retro-reflector to the outlet retro-reflector, wherein, as to both beam paths, the roof line of the inlet retro-reflector of one beam path and the roof line of the outlet retro-reflector of the other beam path are substantially coaxial and inclined 45° with respect to the optical longitudinal axis of the microscope.

Other features, advantages and benefits of the invention will become apparent from the following detailed description when considered in connection with the accompanying drawings.

DETAILED DESCRIPTION OF THE INVENTION

Figure 1:
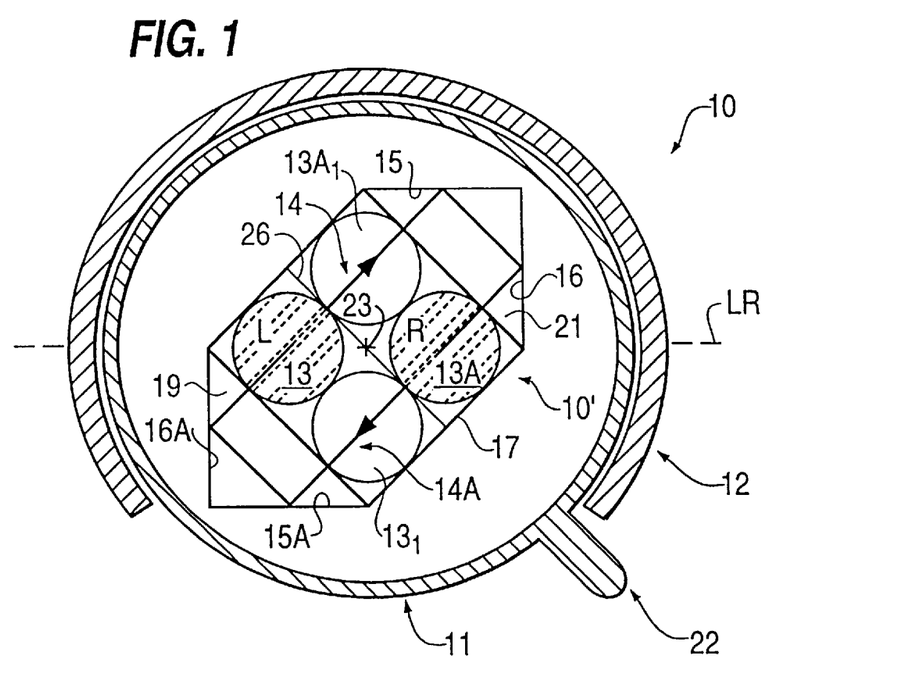
FIG. 1 shows a top view of one embodiment of the invention including the left and right eye pathways depicting the device optically functioning in conjunction with the left and right eye systems of the stereo microscope.

Referring now to FIG. 1, there is shown a top view of a novel image inverting and reversing system 10 according to one embodiment of the invention which includes an arrangement 10' of reflecting surfaces located within an inner housing 11 that is rotatable within an outer housing 12 between an optically functional position as shown in FIG. 1 and an optically non-functional position as will be described in connection with FIG. 3. In both the optically functional and non-functional positions, the arrangement 10' of reflecting surfaces has a generally diagonal orientation in relation to a straight across left-to-right eye orientation represented by dashed line LR in FIG. 1. Outer housing 12 may be fitted with male and female flange or dovetail adapters (not shown) for adapting to a stereo microscope in a typically known manner, above the base portion of the microscope and below the ocular portion, fitting in a similar manner to that of a beam splitter or laser filter.

In the illustrated embodiment, arrangement 10' of the reflecting surfaces is formed by a prism structure 17 containing reflecting surfaces 13, 13A and transmitting portions $13_1$ and $13A_1$, and left and right retroreflectors 19 and 21 containing, respectively, retroreflecting surfaces 15, 16 and 15A, 16A. The retroreflecting surfaces of each retroreflector are perpendicular to one another and are parallel to the longitudinal axis of the microscope.

Figure 5:
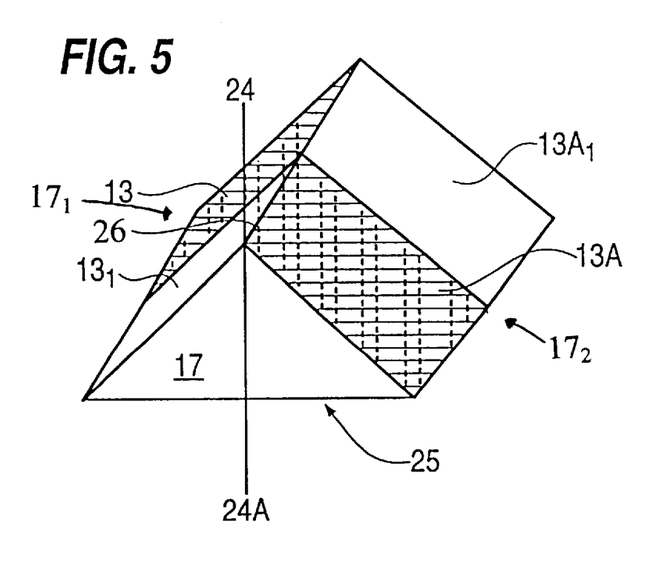
FIG. 5 is a perspective view which shows the 45° reflecting surfaces of the system produced as a single right angle prism structure.

As shown in FIG. 5, prism structure 17 may comprise a single element right angle prism having right surfaces $17_1$, $17_2$. Right surface $17_1$ has a half portion that includes a reflecting surface 13 which is reflective on both sides so that it has oppositely directed reflecting surfaces, and another half portion that presents a transmitting surface $13_1$. The other right surface $17_2$ forms a 90° angle with right surface $17_1$ at an intersecting roof line 26 and includes a half portion that includes a reflective surface 13A, diagonally located relative to half portion 13, and which is also reflective on both sides so that it too has oppositely directed reflecting surfaces. Right surface $17_2$ additionally includes a half portion that presents a transmitting surface $13A_1$ which is diagonally located relative to transmitting surface $13_1$. Right surfaces $17_1$ and $17_2$ are each oriented 45° with respect to the optical longitudinal axis of the microscope which is parallel with line 24–24A in FIG. 5.

In the diagonal, optically functional position shown in FIG. 1, light rays proceeding through the stereo microscope pass through the novel system 10 and as such are interchanged and reinverted according to the depicted pathways. Light rays proceeding from an aerial image (beneath the plane of the drawing page) produced by an indirect ophthalmoscopy lens (not shown) enter the stereo microscope and are reflected off the inlet side (facing into the page) of 45° reflecting surfaces 13 and 13A diagonally across along beam pathways 14 and 14A, respectively, where they are reflected each a first and second time by retroreflector surfaces 15, 16 and 15A, 16A. The light rays continue to the outlet side of 45° reflective surfaces 13A and 13 (facing out of the page) where they are reflected long an original but interchanged line of sight direction though the stereo microscope and its structures to the ocular tubes and associated eyepieces. Reflecting surfaces 13 and 13A are at 90° with respect to one another and may be constructed either as separate right angle prisms or mirrors described below in connection with FIG. 2, or conversely as a single, long right angle prism-type structure spanning the diagonal width of the left/right eye stereo microscope viewing system, and oriented such that a line 24–24A perpendicular to the hypotenuse 25 and intersecting the 90° apex of the structure is parallel to or coaxial with the optic longitudinal axis of the microscope (see FIG. 5). The unique application of the single prism-type structure functioning as the 45° reflective surfaces greatly simplifies the manufacture of the device and virtually guarantees optical alignment throughout the system. It is the rotated positioning and resulting diagonal beam pathways of the invention which allow the utilization of adjacent right angle surfaces of the single element prism structure as the 45° reflectors for each of the left and right eye systems.

Figure 2:
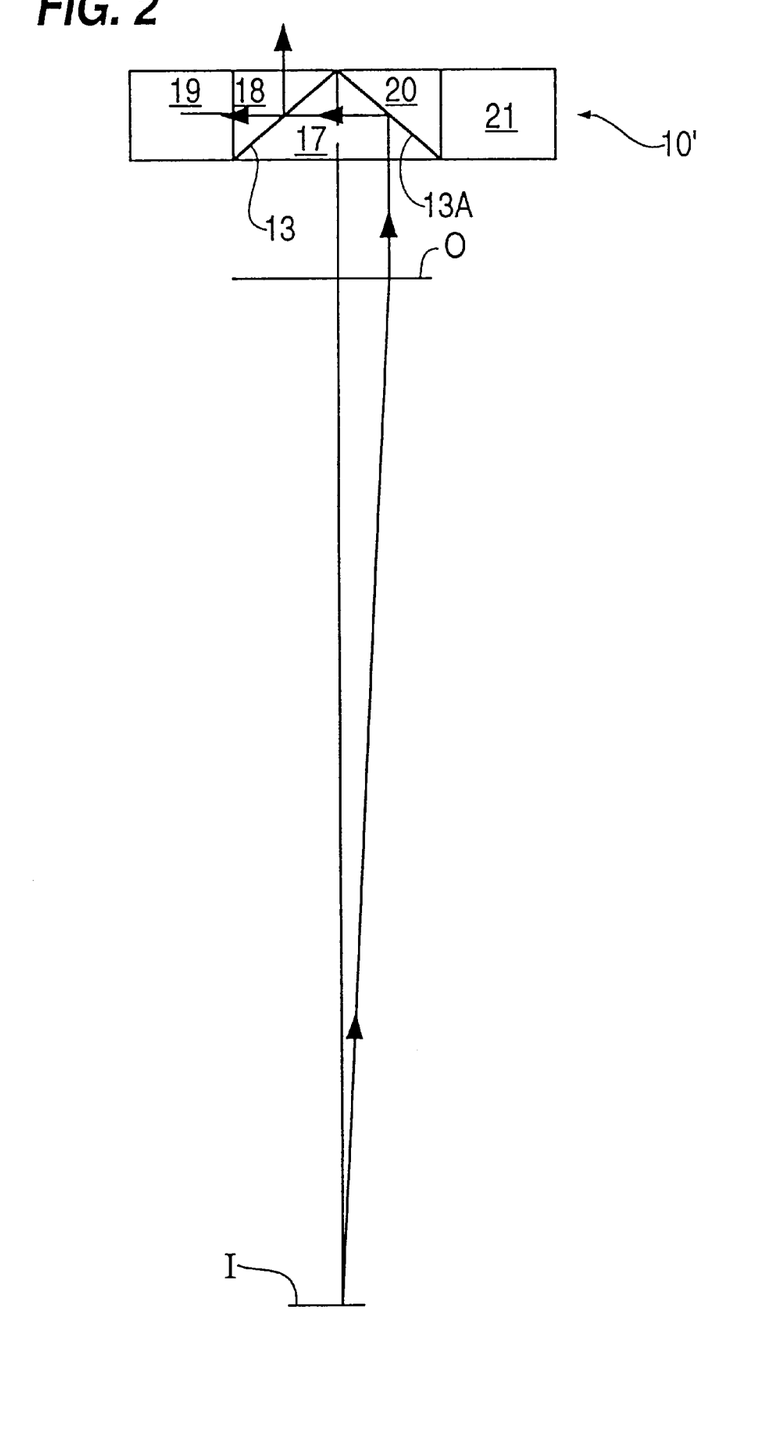
FIG. 2 shows a side view of the reflecting surfaces in FIG. 1 and depicts a right beam pathway as it proceeds through the device and exits as a left beam.

FIG. 2 shows a side view of the invention as depicted in FIG. 1 wherein an arrangement of separate right angle prisms 17, 18 and 20 are appropriately mirror coated or internally reflecting to function in the same manner as the single element prism structure of FIG. 5. For greater clarification only the right beam pathway as it proceeds through the device is shown. Light rays originating at the aerial image I as produced by an indirect fundus imaging lens, as above described, enter the right side portion of the stereo microscope at the objective lens O and proceed through the microscope and incorporated reinverter. Light rays enter the right side of the diagonally oriented right angle prism 17, whose adjacent 90° sides function as the 45° reflecting surfaces 13 and 13A, and are reflected, either by total internal reflection or through the use of a mirror coating, 90° to the incident light toward the opposite side of prism 17. A second right angle prism 18, in this case optically cemented to prism structure 17, allows the rays to proceed uninterrupted from prism structure 17 into prism structure 18 where the light rays then proceed to enter right angle retroreflector prism structure 19. Surfaces 15A and 16A of prism structure 19 (shown in FIG. 1) reflect the light rays by total internal reflection or by means of a mirror coating applied to the reflecting surfaces.

Retroreflected light rays from right angle prism structure 19 proceed back into right angle prism structure 18 where they are either internally reflected off of the hypotenuse of prism structure 18 or are mirror reflected off of either prism structure 18 or prism structure 17, parallel to the original incoming light rays but coaxial with the left eye system of the microscope, thus providing left/right eye exchange as well as image reinversion by mean of the reflection system as shown.

Figure 3:
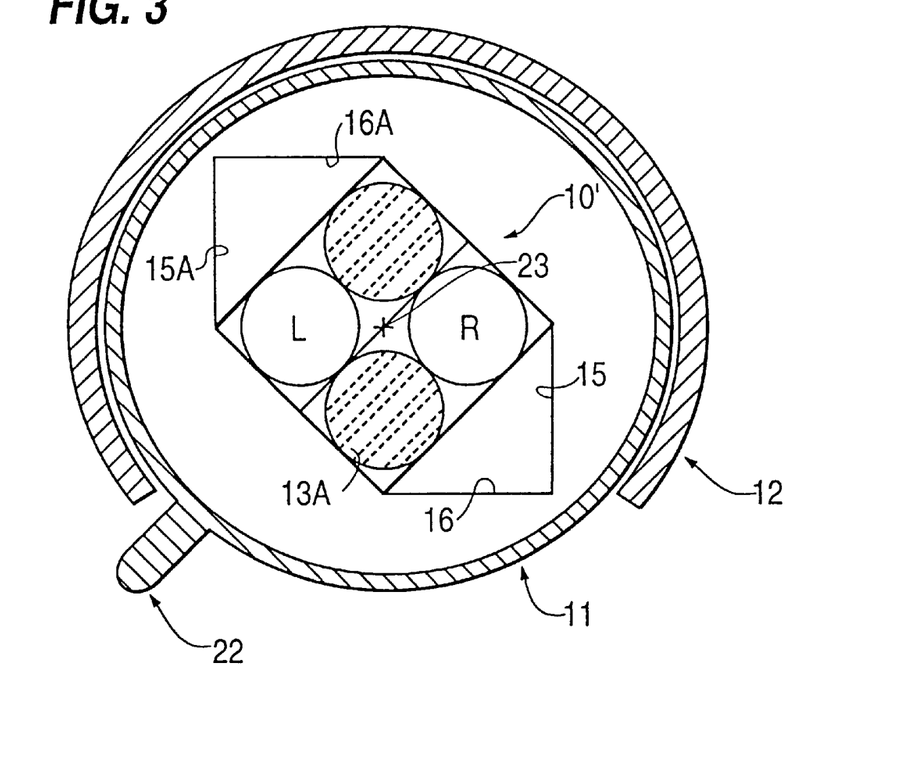
FIG. 3 shows a top view of the FIG. 1 embodiment rotated 90° so that it is optically non-functional as an image erecting the beam exchanging system when used in association with the stereo microscope.

FIG. 3 shows the top view of the invention as depicted in FIG. 1, but rotated 90° in the optically non-functional position when used in association with the stereo microscope. Lever handle 22 of inner housing 11 is shown rotated 90° from its orientation as seen in FIG. 1 in order to rotate the diagonal orientation of the arrangement of reflecting surfaces sufficiently to create a clear pathway through the device to avoid the reinverting and image exchanging properties described. Rotation of inner housing 11 within outer housing 12 may be centered about the optic longitudinal axis through center point 23, as shown in FIG. 3.

Figure 4:
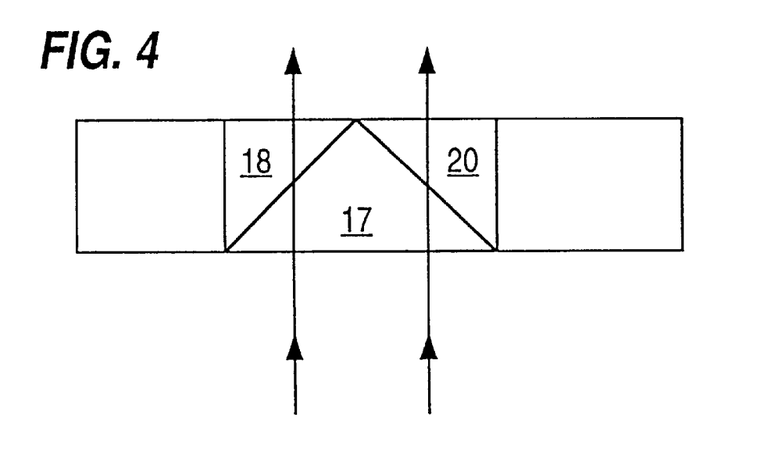
FIG. 4 shows a side view of the reflecting surfaces of FIG. 3 in the 90° rotated and optically non-functional mode, depicting both left and right beam pathways of the stereo microscope as they proceed unaffected directly through the device.

FIG. 4 shows a side view of the invention as depicted in FIG. 3 and the resulting straight passage of both left and right eye light rays through cemented prism structure 17, 18 and 20.

Figure 6:
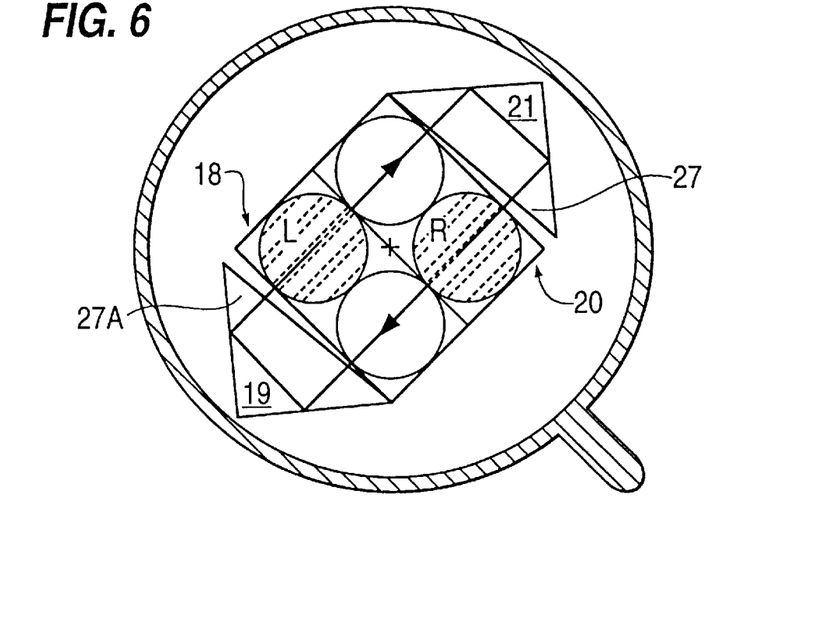
FIG. 6 shows a top view of another embodiment of the invention with the left and right eye retroreflective right angle prisms skewed in relation to the optic pathways through the device.

FIG. 6 shows a top view of an alternate design of the invention wherein the left and right eye retroreflective right angle prism structures 19 and 21 are in spaced apart relationship to the right angle prism structures 18 and 20 respectively and are each skewed 5° in relation to the geometric orientation of prism structures 17, 18 and 20. This arrangement provides optical advantages by causing surface reflections from the hypotenuse faces 27 and 27A of prism structures 19 and 21 to be deflected away from the observer viewing through the stereo microscope.

Figure 7:
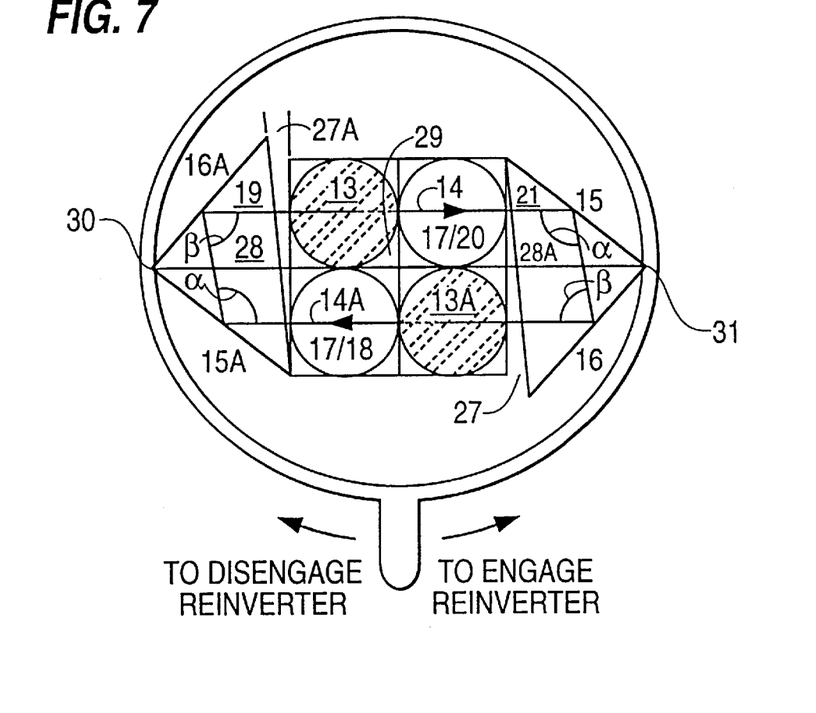
FIG. 7 shows a more detailed top view of the embodiment depicted by FIG. 6, rotated 45°.

FIG. 7 depicts more accurately the dimensional attributes of FIG. 6, wherein features of this embodiment of the invention may be more clearly seen. Light rays reflecting off surfaces 13 and 13A proceed through cemented prism structures 17/18 and 17/20 toward retroreflector structures 19 and 21, respectively, and are refracted and bent as they enter prism structures 19 and 21 according to Snell's law. In this case the retroreflectors are constructed as right angle prisms whose index of refraction is 1.523. The bending of the light rays as described, in combination with the skewed angle of reflecting surfaces 15, 16 and 15A, 16A, results in a first reflection angle $\alpha=96.488°$ off surface 15 and 15A. Proceeding to the second reflecting surfaces 16 and 16A, the light rays are reflected at an angle $\beta=83.5112°$. Finally, proceeding toward the hypotenuse surfaces 27 and 27A the rays are again bent as they enter air, at this point in a pathway parallel to that which they followed prior to entering prism structures 19 and 21, thus allowing the system to maintain correct optical alignment of the viewed image. A further compensatory measure involving a position shift of prism structure 19 and 21 must be taken to assure correct centering of the viewed image. Both skewed prism structures 19 and 21 must be re-centered or repositioned such that refracted lines 28 and 28A, which are extensions of the device center line 29, (defined as the center line between and parallel to left and right eye optical pathways 14 and 14A) intersect the apices or roof lines 30 and 31 of prisms structure 19 and 21, where the respective retroreflective surfaces intersect. It may be clearly seen from this figure that the longitudinal beam pathways 14 and 14A form a rhomboidal configuration based upon the angular deviation from 90° of the reflections within right angle prism structure 19 and 21.

Figure 8:
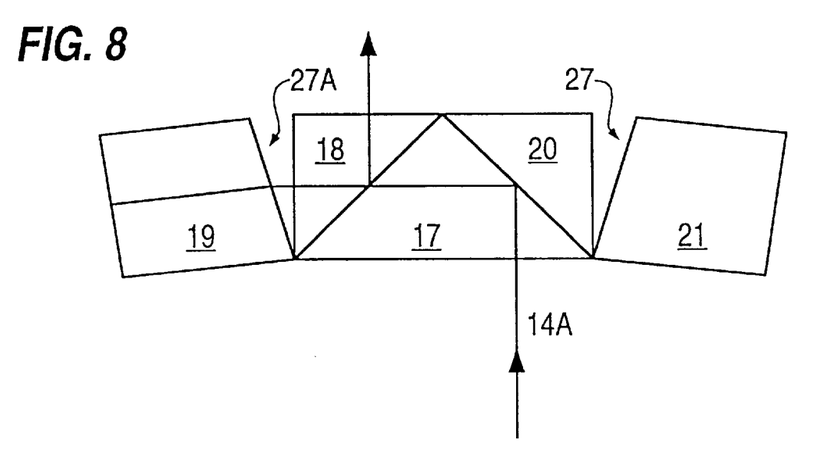
FIG. 8 shows a side view of another embodiment of the of the invention wherein the left and right eye retroreflective right angle prism structures are tilted in relation to the optic longitudinal axis of a stereo microscope.

FIG. 8 shows a side view of another alternate design of the invention wherein the left and right eye retroreflective prism structures 19 and 21 are in spaced apart relationship to right angle prism structures 18 and 20, respectively, such that hypotenuse surfaces 27 and 27A are tilted from the vertical plane parallel to the optic longitudinal axis of the microscope by 20° each. The resulting tilt causes light rays entering the prism structures to be bent approximately 7° from the incident path when using BK7 glass with an index of refraction of 1.517. Retroreflective surfaces 15, 16 and 15A, 16A likewise must be tilted 7° in order to be normal to the refracted rays so that light rays exiting prism structures 19 and 21 and entering prism structure 18 and 20 are parallel to incoming rays 14 and 14A (only ray 14A being shown in FIG. 8). Such a design may prove advantageous in avoiding undesired reflections from the hypotenuse faces in a manner similar to that sown in FIGS. 6 and 7.

Figure 9:
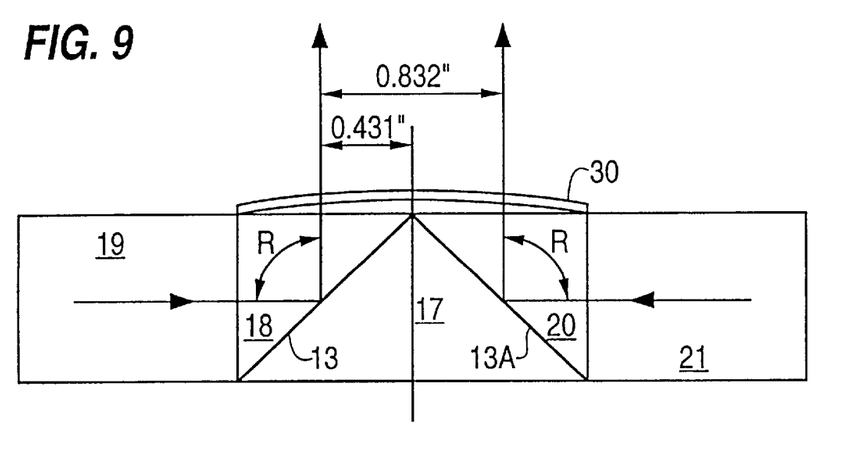
FIG. 9 shows the side view of FIG. 2 with the addition of a single plus powered lens incorporated above the body of reflecting surfaces, and a resulting left and right eye system beam pathway deviation.

FIG. 9 shows an embodiment of the invention wherein positive refractive power is incorporated into the device in order to provide convergence of the ray bundles and beam pathways for the purpose of shortening the working distance and increasing the stereoscopic angle of the stereo microscope when used in association with contact or non-contact indirect fundus imaging lenses during vitreoretinal surgery. In this example, a 1 diopter meniscus lens 30 is positioned above prism structures 17, 18 and 20 in order to provide the positive refractive power as described, resulting in the included reflection angle of R=88.745° off 45° surfaces 13, 13A, as shown. Although shown as a concavo/convex lens, the lens configuration may instead by plano/convex or biconvex. It has been determined that a lens of approximately 1 diopter may sufficiently shorten the working distance by approximately 25–30 mm, thus minimizing the amount of microscope movement required when the physician engages the reinverter of the present invention when changing from a plano/concave style direct ophthalmoscopy contact lens to the high powered indirect ophthalmoscopy contact and non-contact lenses now used in state-of-the-art vitreoretinal procedures. It may be seen from FIG. 9 that the diverging ray pathways within the device are refracted by the plus powered meniscus lens to form parallel pathways above the device within the stereo microscope as is normally the case within conventional stereo microscopes.

Figure 10:
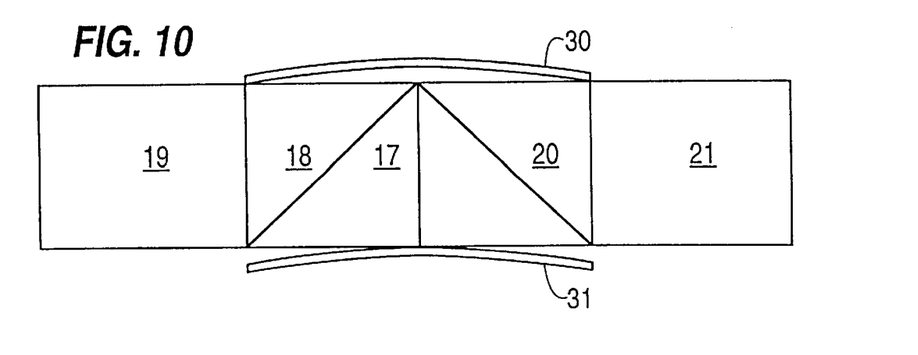
FIG. 10 shows a similar side view to that of FIG. 9 wherein two single plus powered lenses are incorporated, one above the body and the other below the body of reflecting surfaces.

FIG. 10 shows an alternate version of the system incorporating positive refractive power wherein two lenses 30 and 31 are utilized to provide the total power desired, with one lens positioned above the body and the other below the body of reflecting surfaces of the device. Again, although shown as concavo/convex lenses, the lens configurations may instead be plano/convex or biconvex.

Figure 11:
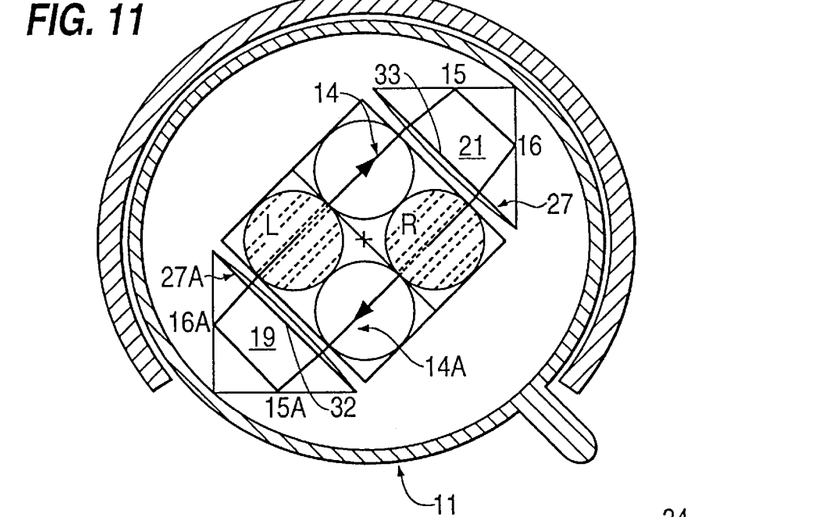
FIG. 11 shows a top view of another embodiment of the invention with the addition of plus powered lenses incorporated within the body of reflecting surfaces.

FIG. 11 shows a similar embodiment of the invention wherein the positive refractive power incorporated into the system comprises convex lenses 32 and 33 optically cemented to the hypotenuse surfaces 27A and 27, respectively, of retroreflectors 19 and 21. Alternatively, hypotenuse surfaces 27A and 27 may be ground and polished with the curvatures incorporated directly into the prism structure. In either case, the positive refractive power incorporated will provide the ray and beam pathway convergence that will shorten the working distance of the microscope as above described. In the diagram, light rays 14A and 14 are refracted by the convex surfaces twice each as they enter and then exit the plano/convex lenses cemented to retroreflectors 19 and 21. As such, the curvature required on the convex lenses may be reduced by approximately ½ in order to achieve the desired refractive power, with the additional benefit of reducing the overall diagonal length of the system. This arrangement also provides optical advantages by causing surface reflections from convex surfaces 32 and 33 to be deflected away from the observer viewing through the stereomicrosocpe while providing a departure from the included 90° reflection angles associated with surfaces 15A, 16A and 15, 16, as depicted in FIG. 11.

Figure 12:
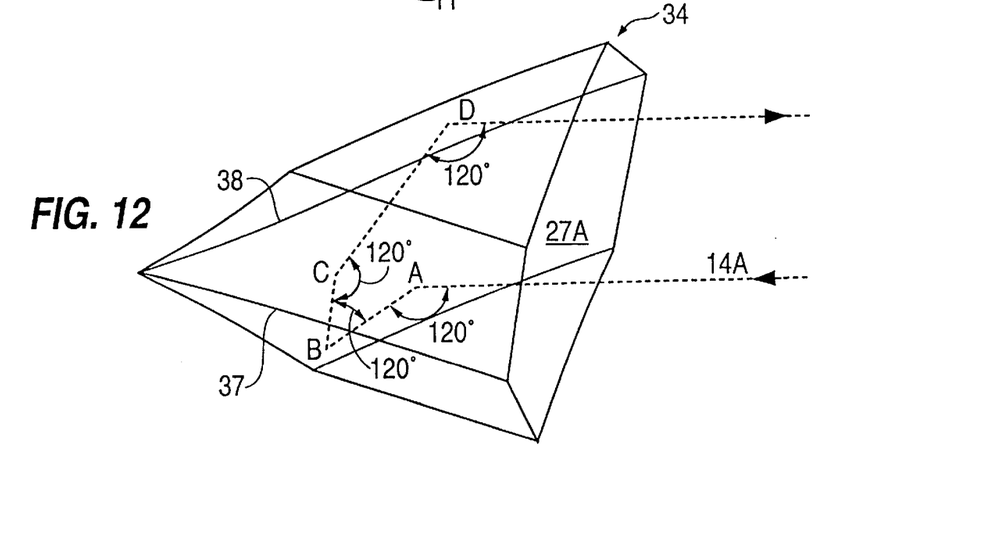
FIG. 12 is a perspective view of a modified retroreflective prism structure that can be used for the left and right eye retroreflectors in the various embodiments of the invention.

FIG. 12 shows an alternate retroreflector design 34 wherein four surfaces A, B, C, and D are utilized in each retroreflecting prism structure, each reflecting surface tilted 45° to the optic longitudinal axis of the microscope. This design of prism structure may be used instead of right angle prism structures 19 and 21 previously mentioned. The two reflecting surfaces A and B are 90° to one another with their roof line 37 forming a 90° angle to the roof line 38 of the second reflecting pair C and D, which are also 90° to one another. Light ray 14A is shown entering surface 27A and reflecting from each surface A, B, C, and D sequentially at a reflected angle of 120°, rather than at 90° as is the case with prior art systems. Such a design insures that total internal reflection of the light rays will occur even in materials of low index of refraction due to the obliqueness of the incident rays, thereby avoiding the necessity of mirror coating the reflecting surfaces. The retroreflector prism structure of FIG. 12 is produced of BK7 glass, with an index of refraction of 1.517. In order to avoid the use of auxiliary prism structures 18 and 20, surface 27A of retroreflector prism structure 34 may be sloped 45° in relation to the plane common to both roof lines, allowing it to be optically cemented directly to right angle prism structure 17. A similar reflecting arrangement to that of FIG. 12 may be utilized advantageously in conventional prism systems such as the Abbe modification of Porro Prism. Alternatively, a four surfaced retroreflector may be produced as an electroformed metal mirror structure, providing similar reflected pathways to that of the glass prism design. Such an electroformed metal mirror structure may be relatively inexpensively manufactured from a master prism form such as that described above. The process of replicating mirrors through electroforming as described above is well known in the art. In systems where the beam pathways are more widely spatially separated, the four surfaced prism structure may be "split" into two, creating two right angle double reflectors used in tandem to provide the inversion in one dimension as required by such systems.

Prism structure 34 as well as the alternate reflectors described above may also be skewed or angled as are prisms structures 19 and 21 as shown in FIGS. 6, 7 and 8. Furthermore, the image erecting and beam path interchanging optical system of the present invention incorporating such a reflector arrangement may also include positive refractive power as shown in FIGS. 9, 10 and 11.

Figure 13:
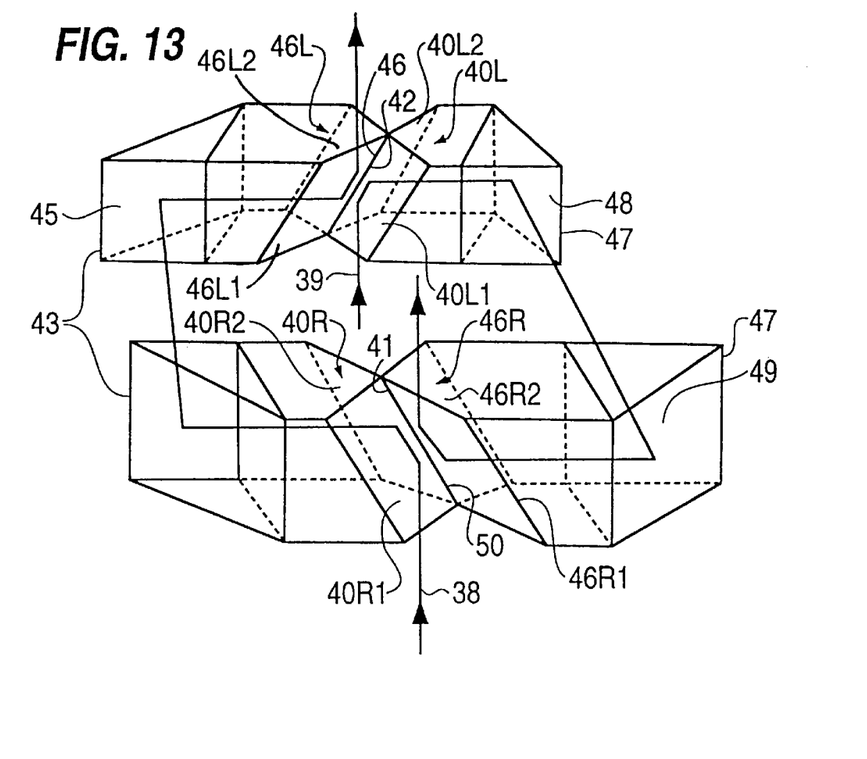
FIG. 13 is a perspective view, partially exploded, of a prism structure according to a further embodiment of the invention.

FIG. 13 shows another embodiment of an image reversing and beam path interchanging system according to the invention in which right and left incident beams 38 and 39 are reflected off inlet retroreflectors 40R and 40L, respectively. Inlet retroreflector 40R has reflecting surfaces 40R1 and 40R2 that form an angle of 90° with one another and an angle of 60° with the optical longitudinal axis of the stereo microscope. Further, reflecting surfaces 40R1 and 40R2 intersect in a roof line 41 that is oriented at a 45° angle in relation to the optical longitudinal axis of the stereo microscope. Inlet retroreflector 40L includes reflecting surfaces 40L1 and 40L2 that are similarly disposed as the reflecting surfaces of inlet retroreflector 40R except that the retroreflector 40L is tilted in an opposite direction such that the roof line 42 of inlet retroreflector 40L makes a 90° angle with roof line 41 of inlet retroreflector 40R. Each of the reflecting surfaces of the inlet retroreflectors deflects the respective incident beam by 120° in a staircase fashion. Retroreflector 40R deflects incident beam 38 90° toward an intermediate retroreflector 43 comprised of reflecting surfaces 44 and 45 which are disposed at an angle of 90° relative to one another and define planes that intersect in a line that is parallel to the longitudinal axis of the stereo microscope such that beam 38 is deflected toward an outlet retroreflector 46L having a roof line 46 that is substantially coaxial with roof line 42, and comprising reflecting surfaces 46L1 and 46L2 that form an angle of 90° relative to one another and 60° with the optical longitudinal axis of the stereo microscope. Similarly, retroreflector 40L deflects incident beam 39 toward intermediate retroreflector 47 comprised of reflecting surfaces 48 and 49 which are disposed at an angle of 90° relative to one another and define planes that intersect in a line that is parallel to the longitudinal axis of the stereo microscope such that beam 39 is deflected toward an outlet retroreflector 46R having a roof line 50 that is substantially coaxial with roof line 41, and comprising reflecting surfaces 46R1 and 46R2 that form an angle of 90° relative to one another and 60° with the optical longitudinal axis of the stereo microscope. Each of the reflecting surfaces of the outlet retroreflectors 46R and 46L deflect the respective beams by 120° to produce outlet beams that are parallel to the optical longitudinal axis and which have been interchanged right to left relative to the input beams. It is possible, of course, that one or both pairs of intermediate reflecting surfaces, 44, 45 and 48, 49 could take the form of the embodiment illustrated in FIG. 12. Further, it is not necessary that the inlet and outlet retroreflectors in both beam paths 38 and 39 be retroreflectors.

Figure 14:
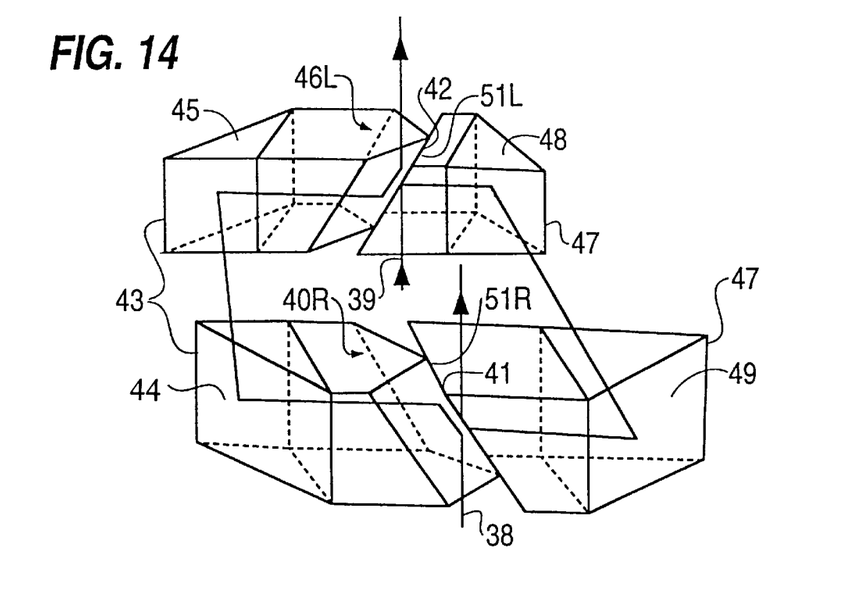
FIG. 14 is a perspective view, partially exploded, showing a modification of the FIG. 13 embodiment.

FIG. 14 shows an embodiment wherein the reflecting surfaces in beam path 38 have the same configuration as described above in FIG. 13. However, the inlet and out reflecting surfaces deflecting beam path 39 are planar reflecting surfaces 51L and 51R, respectively, which are at an angle of 45° in relation to the optical longitudinal axis of the stereo microscope and are substantially co-planar with the respective roof lines 41 and 42 of input and output retroreflectors 40R and 40L. Intermediate retroreflector 47 deflects beam path 39 from the inlet reflecting surface 51L to the outlet reflecting surface 51R in the same manner as in FIG. 13.

The invention has been described in detail with respect to preferred embodiments, and it will now be apparent from the foregoing to those skilled in the art that changes and modifications may be made without departing from the invention in its broader aspects, and the invention, therefore, as defined in the appended claims is intended to cover all such changes and modifications as fall within the true spirit of the invention.

What is claimed is:

1. An inverting and reversing prism system for a stereo microscope having an optical longitudinal axis and left and right eye viewing systems having left and right longitudinal axes, respectively, along which left and right beam paths are transmitted, respectively, comprising:

at least four reflecting surfaces in each beam path, two of the reflecting surfaces in each beam path comprising inlet and outlet surfaces, respectively, for deflecting the beam path by 90°, the inlet and outlet surfaces in each beam path being oriented 45° relative to the optical longitudinal axis of the microscope and 90° relative to each other, with a line of intersection of planes containing the inlet and outlet surfaces in each beam path defining an angle of 45° with respect to a plane through the left and right longitudinal axes of the left and right eye viewing systems, with at least two other of the reflecting surfaces in each beam path comprising intermediate reflecting surfaces disposed for deflecting the respective beam path from the inlet surface to the outlet surface.

2. The inverting and reversing prism system according to claim 1, wherein the at least two intermediate reflecting surfaces in each beam path consists of two intermediate reflecting surfaces.

3. The inverting and reversing prism system according to claim 2, wherein the intermediate reflecting surfaces in each beam path make an angle of 90° relative to one another.

4. The inverting and reversing prism system according to claim 2, wherein the intermediate reflecting surfaces in each beam path are each arranged to deflect the respective beam path by 90°.

5. The inverting and reversing prism system according to claim 2, wherein the intermediate reflecting surfaces in each beam path are parallel to the optical longitudinal axis of the microscope.

6. The inverting and reversing prism system according to claim 1, wherein, as to at least one of the left and right beam paths, the at least four reflecting surfaces comprise six reflecting surfaces, with four of the six reflecting surfaces comprising intermediate reflecting surfaces each inclined 45° with respect to the optical longitudinal axis of the microscope, the four intermediate reflecting surfaces include a first pair of intermediate reflecting surfaces disposed 90° to one another and intersecting in a first roof line, and a second pair of intermediate reflecting surfaces disposed 90° to one another and intersecting in a second roof line, and the first and second roof lines form an angle of 90°.

7. The inverting and reversing prism system according to claim 1, wherein a left beam path incident on a left one of the inlet surfaces is deflected via the intermediate reflecting surfaces in that beam path to a right one of the outlet surfaces and a right beam path incident on a right one of the inlet surfaces is deflected via the intermediate reflecting surfaces in that beam path to a left one of the outlet surfaces, and the left inlet and outlet surfaces comprise a first pair of oppositely directed reflecting surfaces and the right inlet and outlet surfaces comprise a second pair of oppositely directed reflecting surfaces.

8. The inverting and reversing prism system according to claim 7, wherein the first and second pairs of oppositely directed reflecting surfaces comprise separate internally reflecting prism members positioned adjacent one another.

9. The inverting and reversing prism system according to claim 8, wherein the oppositely directed reflecting surfaces of each pair of oppositely directed reflecting surfaces constitute, respectively, the hypotenuse of a right angle prism.

10. The inverting and reversing prism system according to claim 7, wherein the reflecting surfaces of the first and second pairs of oppositely directed reflecting surfaces are mirrored surfaces.

11. The inverting and reversing prism system according to claim 10, wherein the mirrored surfaces are respective right surfaces of a right angle prism, each right surface being mirror coated for reflecting in opposite directions in a half portion that is diagonal to the mirrored half portion of the other right surface.

12. The inverting and reversing prism system according to claim 1, further including means for rotating the system around the optical longitudinal axis between an operative position in which the reflecting surfaces are disposed in the beam paths and an inoperative position in which the reflecting surfaces are removed from the beam paths.

13. The inverting and reversing prism system according to claim 6, further including means for rotating the system around the optical longitudinal axis between an operative position in which the reflecting surfaces are disposed in the beam paths and an inoperative position in which the reflecting surfaces are removed from the beam paths.

14. The inverting and reversing prism system according to claim 1, and further including a lens system disposed in the beam paths for providing magnification according to principles of a Galilean telescope.

15. The inverting and reversing prism system according to claim 1, and further including a lens system including positive refractive power disposed in the beam paths for reducing a working distance of the microscope.

16. The inverting and reversing prism system according to claim 6, wherein each of the intermediate reflecting surfaces deflects the beam path by 120°.

17. An inverting and reversing prism system for a stereo microscope having an optical longitudinal axis and left and right eye viewing systems having left and right longitudinal axes, respectively, along which left and right beam paths are transmitted, respectively, comprising:

two reflecting surfaces in each beam path comprising inlet and outlet surfaces, respectively, for deflecting the beam path by 90°, the inlet and outlet surfaces in each beam path being oriented 45° relative to the optical longitudinal axis of the microscope and 90° relative to each other, and intermediate reflecting surfaces disposed for deflecting the respective beam path from the inlet surface to the outlet surface of the respective beam path, wherein, in at least one of the left and right beam paths, the intermediate reflecting surfaces include four intermediate reflecting surfaces each inclined 45° with respect to the optical longitudinal axis of the microscope, the four intermediate reflecting surfaces including a first pair of intermediate reflecting surfaces disposed 90° to one another and intersecting in a first roof line and a second pair of intermediate reflecting surfaces disposed 90° to one another and intersecting in a second roof line, and the first and second roof lines forming an angle of 90°.

18. The inverting and reversing prism system according to claim 17, wherein a left beam path incident on a left one of the inlet surfaces is deflected via the intermediate reflecting surfaces in that beam path to a right one of the outlet surfaces and a right beam path incident on a right one of the inlet surfaces is deflected via the intermediate reflecting surfaces in that beam path to a left one of the outlet surfaces, and the left inlet and outlet surfaces comprise a first pair of oppositely directed reflecting surfaces and the right inlet and outlet surfaces comprise a second pair of oppositely directed reflecting surfaces.

19. The inverting and reversing prism system according to claim 18, wherein the first and second pairs of oppositely directed reflecting surfaces comprise separate internally reflecting prism members positioned adjacent one another.

20. The inverting and reversing prism system according to claim 19, wherein the oppositely directed reflecting surfaces of each pair of oppositely directed reflecting surfaces constitute, respectively, the hypotenuse of a right angle prism.

21. The inverting and reversing prism system according to claim 18, wherein the reflecting surfaces of the first and second pairs of oppositely directed reflecting surfaces are mirrored surfaces.

22. The inverting and reversing prism system according to claim 21, wherein the mirrored surfaces are respective right surfaces of a right angle prism, each of the right surfaces being mirror coated for reflection in opposite directions in a half portion that is diagonal to the mirrored half portion of the other right surface.

23. The inverting and reversing prism system according to claim 17, and further including a lens system disposed in the beam paths for providing magnification according to principles of a Galilean telescope.

24. The inverting and reversing prism system according to claim 17, and further including a lens system including positive refractive power disposed in the beam paths for reducing a working distance of the microscope.

25. The inverting and reversing prism system according to claim 17, wherein each of the intermediate reflecting surfaces deflects the beam path by 120°.

26. In an inverting and reversing prism system for a stereo microscope having an optical longitudinal axis and left and right eye viewing systems having left and right longitudinal axes, respectively, along which left and right beam paths are deflected by a plurality of reflecting surfaces for inverting and reversing an image, the improvement wherein:

two retroreflectors constituting inlet and outlet retro reflectors, respectively, are disposed in one of the left and right beam paths and at least two intermediate reflecting surface are disposed in the one beam path for deflecting the beam from the inlet retroreflector to the outlet retroreflector, each retroreflector including two reflecting surfaces oriented 90° to one another and intersecting in a roof line inclined 45° with respect to the optical longitudinal axis of the microscope.

27. The inverting and reversing system according to claim 26, wherein the at least two intermediate reflecting surfaces in the one beam path constitute two reflecting surfaces parallel to the optical longitudinal axis and inclined by 90° relative to one another.

28. The inverting and reversing system according to claim 26, wherein the other of the left and right beam paths includes planar inlet and outlet reflecting surfaces inclined 45° with respect to the optical longitudinal axis of the microscope, wherein the roof line of the inlet retroreflector of the one beam path is substantially coplanar with the planar outlet reflecting surface of the other beam path, and the roof line of the outlet retroreflector of the one beam path is substantially coplanar with the inlet reflector of the other beam path.

29. The inverting and reversing prism system according to claim 26, wherein each surface of the inlet and outlet retroreflectors deflects the respective beam path by 120°.

30. The inverting and reversing prism system according to claim 26, wherein each of the reflecting surfaces of the inlet and outlet retroreflectors is oriented 60° relative to the optical longitudinal axis of the microscope.

31. An inverting and reversing prism system for a stereo microscope having an optical longitudinal axis and left and right eye viewing systems having left and right longitudinal axes, respectively, along which left and right beam paths are transmitted, respectively, comprising:

three retroreflectors in each beam path, each retroreflector including two reflecting surfaces oriented 90° to one another and defining planes that intersect in a roof line, two of the retroreflectors in each beam path being inlet and outlet retroreflectors, respectively, and the one other retroreflector in each beam path being an intermediate retroreflector for deflecting the respective beam from the inlet retroreflector to the outlet retroreflector, wherein, as to both beam paths, the roof line of the inlet retroreflector of one beam path and the roof line of the outlet retroreflector of the other beam path are substantially coaxial and inclined 45° with respect to the optical longitudinal axis of the microscope.

32. The inverting and reversing prism system according to claim 31, wherein each surface of the inlet and outlet retroreflectors deflects the respective beam path by 120°.

33. The inverting and reversing prism system according to claim 32, wherein each of the reflecting surfaces of the inlet and outlet retroreflectors is oriented 60° relative to the optical longitudinal axis of the microscope.

* * * * *